United States Patent
Green (10) Patent No.: US 7,747,814 B2
(45) Date of Patent: Jun. 29, 2010

(54) VIRTUAL MACHINE STATE SNAPSHOTS

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 11/768,758

(22) Filed: Jun. 26, 2007

(65) Prior Publication Data

US 2009/0006728 A1    Jan. 1, 2009

(51) Int. Cl.
    *G06F 13/00* (2006.01)
(52) U.S. Cl. .......................... 711/104; 711/6
(58) Field of Classification Search ............. 711/104
    See application file for complete search history.

(56) References Cited

U.S. PATENT DOCUMENTS

| | | | | |
|---|---|---|---|---|
| 6,434,681 | B1 | 8/2002 | Armangau | 711/162 |
| 6,748,504 | B2 | 6/2004 | Sawdon et al. | 711/162 |
| 7,072,916 | B1 | 7/2006 | Lewis et al. | 707/205 |
| 7,093,086 | B1 | 8/2006 | Van Rietschote | 711/161 |
| 7,191,441 | B2 | 3/2007 | Abbott et al. | 718/1 |
| 7,313,793 | B2 * | 12/2007 | Traut et al. | 718/1 |
| 2002/0078002 | A1 | 6/2002 | Bottomley et al. | 707/1 |
| 2005/0138312 | A1 | 6/2005 | Kubo et al. | 711/162 |
| 2006/0085784 | A1 | 4/2006 | Traut et al. | 718/1 |
| 2006/0101223 | A1 * | 5/2006 | Lekatsas et al. | 711/173 |
| 2006/0236051 | A1 | 10/2006 | Haruma et al. | 711/162 |
| 2008/0002899 | A1 * | 1/2008 | Breswick et al. | 382/244 |

FOREIGN PATENT DOCUMENTS

JP         407210693       *   8/1995

OTHER PUBLICATIONS

Cunei, A. et al., "A New Approach to Real-Time Checkpointing," *VEE*, Ottawa, Ontario, Jun. 14-16, 2006, 68-77.
Sun Microsystems, Inc., "Sun StorageTek Data Snapshot Software," http://www.sun.com/stragetek/managment_software/data_protection/data_snapshot/, 2007, downloaded Apr. 3, 2007, 1 page.

* cited by examiner

*Primary Examiner*—Mardochee Chery
(74) *Attorney, Agent, or Firm*—Woodcock Washburn LLP (57) ABSTRACT

Saving state of Random Access Memory (RAM) in use by guest operating system software is accomplished using state saving software that starts a plurality of compression threads for compressing RAM data blocks used by the guest. Each compression thread determines a compression level for a RAM data block based on a size of a queue of data to be written to disk, then compresses the RAM data block, and places the compressed block in the queue.

20 Claims, 4 Drawing Sheets

VIRTUAL MACHINE STATE SNAPSHOTS

BACKGROUND

Saving state of a computer system generally comprises persisting the information stored in the system's Random Access Memory (RAM) to a permanent or semi permanent computer readable medium, such as a hard disk, flash memory, other disk drives, or the like. Additional information, e.g., a processor or other hardware activity log, processor state information and/or other hardware state information, may also be saved as part of saving state. Saving state is also referred to as taking a state "snapshot," because it records the state of a computer system at a moment in time.

State snapshots are useful in a variety of contexts. For example, if operation of a computer system is paused by a user, or if a computer system "crashes" due to a hardware, software or user error, then saved state information is useful for returning the computer system to a last known "good" state. State snapshots can also be used to recapture data lost due to user or machine error, as well as for troubleshooting and diagnostic purposes.

One familiar example of a state saving feature is the "hibernate" feature available on personal computers running the popular WINDOWS XP® or VISTA® operating systems made by MICROSOFT Corporation of Redmond, Wash. This feature is available from the WINDOWS control panel, as a "power option." Using this feature, a user may set their computer to hibernate upon command, thereby causing it to save state and shut off power to the processor.

State snapshots are also useful in the realm of so-called "virtual machine" technology, however saving state in this context presents a variety of unique challenges. Virtual machine technology refers to arrangements wherein software, such as a "host" operating system, emulates a hardware environment in which other software, e.g., a "guest" operating system, executes. Saving state of a virtual machine may be expensive in terms of processor time and disk throughput, while such resources may be limited due to ongoing demands of the host and/or other guest software. This is in contrast to hibernation, in that no other demands are being placed on the processor or disk during hibernation.

The increasing importance of virtual machine technologies today warrants improved systems and methods for saving state in the context of virtual machine technologies.

SUMMARY

In consideration of the above-identified shortcomings of the art, the present invention provides a system, method, and computer readable media for saving state of Random Access Memory (RAM) in use by guest operating system software. In one embodiment, a computer system is provided comprising a plurality of processor cores, a RAM, a persistent memory such as a hard disk, and a queue of data to be written in said persistent memory. The system is equipped with state saving software that starts a plurality of compression threads for compressing RAM data blocks used by the guest. Each compression thread determines a compression level for a RAM data block based on a size of said queue, then compresses the RAM data block, and places the compressed block in the queue.

A corresponding method comprises starting a plurality of compression threads, determining, by a compression thread, a compression level, wherein said determining is based on a size of a queue comprising data to be written in said persistent memory, compressing, by said compression thread, a guest operating system Random Access Memory (RAM) data block at said compression level, placing said RAM data block in said queue, and writing said RAM data block to said persistent memory. As is appreciated by those of skill in the art, such method may be reflected in instructions stored on a computer readable medium, so that when the instructions are executed by a computer processor, the method is performed.

Other advantages and features of the invention are described below.

BRIEF DESCRIPTION OF THE DRAWINGS

The systems and methods for virtual machine state snapshots in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
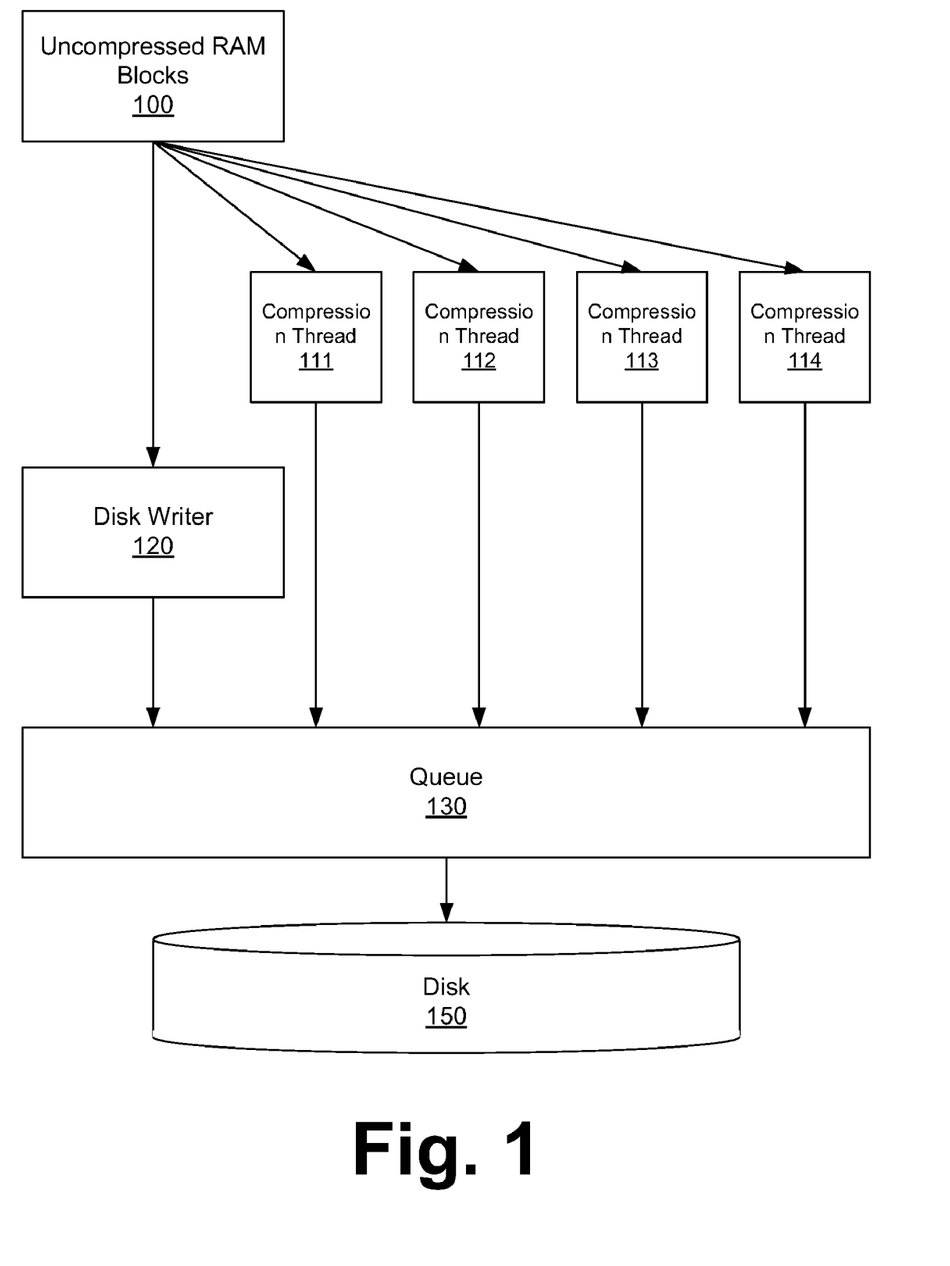
FIG. 1 provides a schematic diagram illustrating compressing RAM blocks by a plurality of compression threads, then placing compressed blocks in a queue to be written to disk.

FIG. 1 provides a schematic diagram illustrating compressing RAM blocks 100 by a plurality of compression threads 111-114, then placing compressed blocks in a queue 130 to be written to disk 150. A virtual machine may have many gigabytes of virtual RAM associated with it. Much of this virtual RAM may be stored in real RAM 100. When a virtual machine state save or state snapshot is desired, the content of this RAM 100 is preferably compressed and then written into a file on disk 150.

One example of a "virtual machine" as the term is used herein comprises a guest operating system or other guest software which accesses "hardware" that is in reality at least partially emulated by a host. Thus, for example, a guest operating system may believe it has access to a physical hard disk, while in fact the hard disk is emulated by a host.

Referring back to FIG. 1, in one embodiment, each compression thread 111-114 takes a RAM data block from 100, compresses it, places it in queue 130, then optionally takes another RAM data block, compresses that, and so on. The use of a plurality of threads 111-114 allows for higher compression throughput relative to using only one thread. Up to one thread per logical processor, hyperthread, or per hardware core is advantageous.

A compression level to be used by a compression thread 111-114 may be determined based on how much data is already queued in 130 for writing to the disk 150. It will be appreciated that today's compression algorithms can be set to a multitude of "compression levels" wherein higher compression levels compress data in additional ways beyond those used at lower compression levels.

The compression threads 111-114 can thus pick among multiple compression levels on the spectrum from fast (but minimal compression) through slow (but maximal compression) depending on the degree to which the disk 150 is keeping up. If the disk 150 is keeping up well, then queue 130 will be relatively small, and the compression threads 111-114 can adjust more toward fast. If the disk 150 is not keeping up well, then queue 130 will be relatively large, and the compression threads 111-114 can adjust more toward slow.

The degree to which the disk 150 is keeping up relative to compression threads 111-114 keeping up can be ascertained from the amount of data that is queued in 130 for writing to the disk 150. The disk 150 removes data from queue 130 as it is written to disk 150, thereby making the queue size smaller. The compression threads 111-114, on the other hand, increase the size of the queue 130 by adding RAM data blocks (compressed or otherwise) to it.

When the queue 130 is short, the threads 111-114 make the queue 130 longer using "cheap" options (in terms of time). When the queue 130 is long, the threads 111-114 make the queue 130 longer using "expensive" options. The "expensive" options are more expensive time-wise, but also better in terms of compression efficiency. In this way, an equilibrium is reached that picks the highest level of compression that can be achieved while still keeping the disk 150 busy. For example, if the queue 130 is near minimal fullness, then the lowest compression level is chosen. The more full the queue 130 is, the higher the compression level chosen. If the queue is completely full, then the compression threads 111-114 can wait for the queue 130 to be non-full. Disk writer 120 can be responsible for waking up the compression threads 111-114 to resume activity when the queue 130 is no longer full.

The extreme on the spectrum toward fast (for the threads 111-114) is completely uncompressed. In one embodiment, this setting of "no compression, very fast" is picked only if there is less than a predetermined amount of data queued to the disk 150. The disk writer 120 may be responsible for placing uncompressed RAM data blocks in queue 130 in this situation. While not required in all embodiments, it may be advantageous to allow only the disk writer 120 to pick the "no compression" setting, and only if fewer than the predetermined minimal amount of data is queued to the disk 150. Compression threads 111-114 may always choose a compression level that is more compressed than "no compression," and may pick higher levels of compression when the amount of data in the queue 130 is greater.

By tying compression level used by compression threads 111-114 and the amount of data in queue 130, as described above, a virtual machine state save operation self-tunes to maximize the number of RAM data blocks 100 that are compressed while taking a state snapshot, but not at the expense of making the snapshot take more time to complete. The self-tuning algorithm ensures that both the threads 111-114 and disk 150 are kept busy continuously during the state snapshot process. If the threads can't provide enough compressed data to keep the disk 150 busy, the disk writer 120 may be instructed to write uncompressed data 100, thereby skipping the compression step for those blocks. If the threads 111-114 executing on CPU cores are able to provide enough compressed data to keep the disk 150 busy, then all the blocks may be compressed before writing to disk 150, at a level of compression that allows the compression threads 111-114 to continue to keep up.

Compression levels may be determined by tying compression levels to particular queue 130 size ranges. The queue 130 size range corresponding to a compression level should be set wide enough to prevent immediate over-compensation to a lower compression level upon the compression threads reaching a next highest compression level. In other words, if level 3 compression is on average twice as time consuming per compressed byte as level 2 compression, the level 2 interval should be wide enough to accommodate a typical compressed level 2 RAM data block, times the number of compression threads, times the CPU time cost ratio (2 in this example), plus a small pad.

This allows for the compression threads to "prove" by compressing fast enough at level 2 that the level 2 interval won't be completely gone (thanks to the pad) due to compressing one block per compression thread at level 3. The goal is to interleave between two compression levels or peg all threads 111-114 at max compression, rather than constantly over-compensate by ramping up through compression levels until an expensive level is reached (in terms of time cost), then spending so much time on one block at that expensive level that the next compression level drops by more than one level. Such a "saw tooth" can be avoided by making the queue 130 size ranges associated with compression levels wide enough and/or making the differences between the time cost at successive compression levels small enough. It can be desirable to avoid saw-toothing of the compression level because sawtoothing is generally less efficient.

In another embodiment, a limit may be imposed on the amount of data that is allowed to be queued in 130 for writing to the disk 150 at a time. In general, the limit may be a maximum queue 130 size determined by requiring enough data in queue 130 to keep the disk 150 continuously busy, plus some cushion, but not so much cushion that RAM used for writing data to disk 150 is wasted by having too much data buffered. If this predetermined limit is reached, the compression threads 111-114 may be paused until the size of the queue 130 drops below the maximum size limit.

In one embodiment, compression threads 111-114 can be set to a low thread priority, thereby giving other threads running on the CPU a relatively higher priority. It can be preferable in such embodiments to either return compression threads 111-114 to normal priority or cancel compression and fall back to placing uncompressed RAM data blocks in queue 130 near the end of the state save operation. This allows the state save to finish reliably even if the computer system is under significant CPU load.

Similarly, the priority of disk 150 Input/Output (I/O) for writing the state snapshot blocks (compressed or not) can be adjusted relative to the priority of disk I/O for other purposes. Once the thread priority for compression and the disk I/O priority for writing state snapshot data are established, the most may be made of available CPU and disk 150 resources by appropriately balancing them as described above.

In one embodiment, raw uncompressed RAM data blocks 100 can also be placed in queue 130 by the disk writer 120 as necessary to keep the queue 130 over a predetermined minimal size, thereby ensuring that disk 150 is kept continuously busy. Uncompressed RAM data blocks 100 can also be placed in queue 130 by the disk writer 120 to complete a state save operation as described above.

Figure 2:
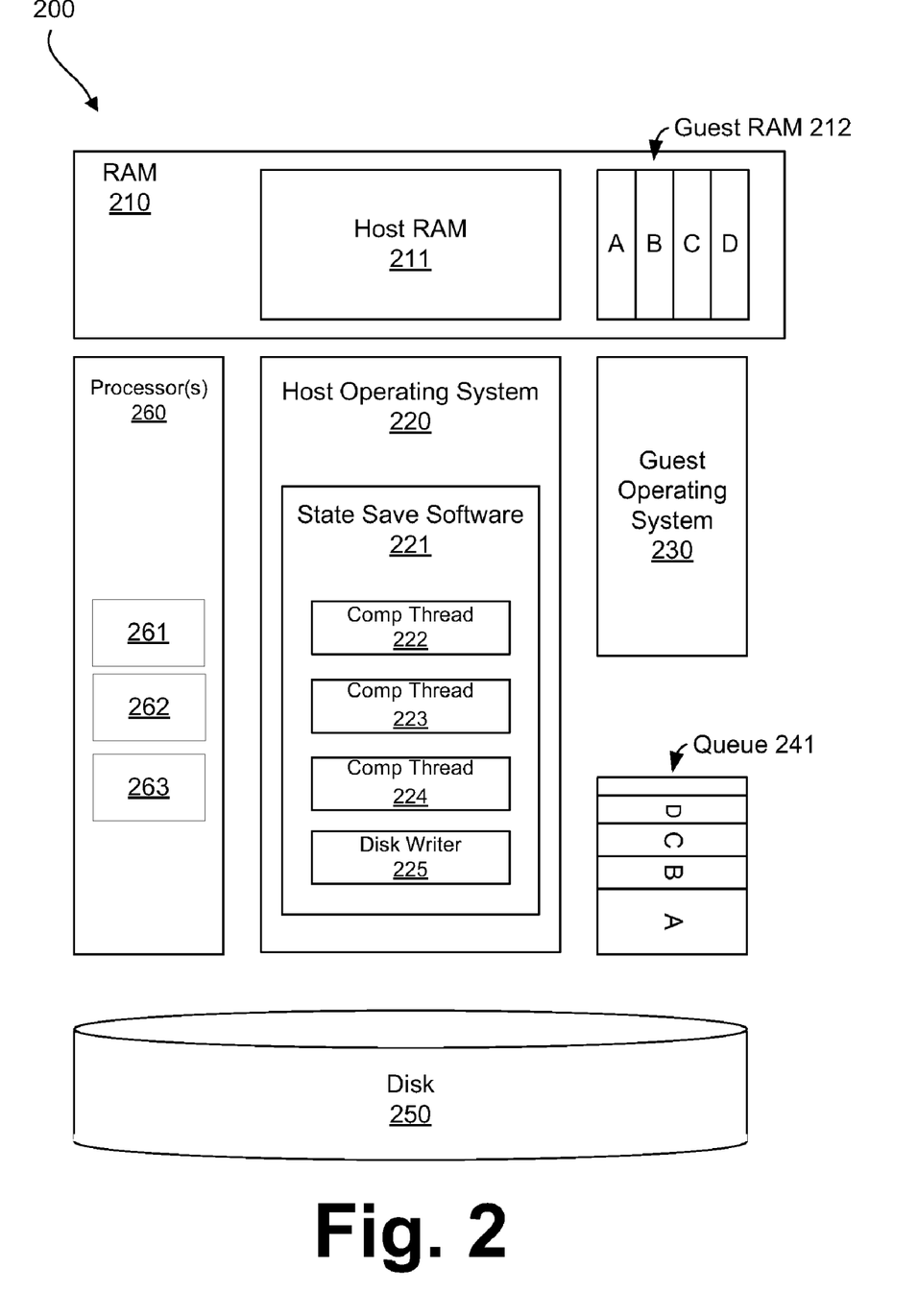
FIG. 2 illustrates components of a system incorporating aspects of the invention, including state save software that opens compression threads for placing compressed RAM blocks in a queue to be written to disk.

FIG. 2 illustrates components of a computer system 200 incorporating aspects of the invention. The computer system 200 may comprise one or more processors 260, including processor 261, processor 262, and processor 263. Processors 260 may be physical or logical processors. Multiple processor systems are emerging in the industry, as are single processor systems that are configured to behave as multiple processors.

Computer system may also include a Random Access Memory (RAM) 210. RAM may comprise one or more hardware components that are physically coupled to processors 260 by way of a bus (not shown). Physical RAM may be logically divided using techniques known in the art. Processors 260 may share physical RAM components or may each have their own RAM.

RAM 210 may be divided into host RAM 211 accessible by host software such as host operating system 220, and guest RAM 212 accessible by guest or virtual machine software such as guest operating system 230. For example, host RAM 211 may comprise a contiguous interval of RAM 210 addresses that are reserved for exclusive use by host 220. Guest RAM 212 may comprise a contiguous segment of RAM 210 addresses that are reserved for exclusive use by guest 220. In another embodiment, RAM 210 may be logically divided by the host 220, and need not correspond to any division of physically contiguous RAM addresses. In still further embodiments, guest RAM 212 may be emulated by host 220 and placed a portion of host RAM 211, e.g. a portion of host RAM 211 that is reserved for exclusive use by the guest 230.

Guest RAM 212 is illustrated as comprising a plurality of RAM data blocks A, B, C, and D. These RAM data blocks are segments of guest RAM 212 of any arbitrary size. The RAM data blocks may comprise blocks that are physically proximal in the RAM 210 hardware. In embodiments where guest RAM 212 is emulated or otherwise logical rather than physical, RAM data blocks may be similarly abstracted as necessary.

Host 220 and guest 230 may comprise software that executes on processors 260. In the case of guest 230, emulation software on host (not shown) may retain primary control of a processor 261 while guest 230 in fact executes via the emulation software. However, in some virtual machine technologies it is also known to allow a guest 230 direct execution by a processor such as 261, while such execution remains subject to the supervision and interruption as necessary by the host 220.

The system 200 may further comprise a persistent memory such as disk 250. Disk 250 may be a computer system local hard disk as that term is understood in the art. Disk 250 may also be a "logical" disk drive such as a network drive under control of a server to which computer system 200 is communicatively coupled. So-called "flash" memory is also widely available today and may be used to persist data in embodiments of the invention. There are a great many ways to persist digital data today and the invention is not limited to any one in particular.

Disk 250 may be under control of software or hardware that is responsible for Input/Output operations involving the disk 250. Such software or hardware may comprise software that executes on processors 260 under the umbrella of host 220, and may comprise or interoperate with special purpose software that executes on hardware (not shown) associated with disk 250.

The system 200 may further comprise a queue of data 241 to be written in the persistent memory 250. The queue 241 may physically reside in a portion of RAM 210, e.g. in a portion of host RAM 211. Alternatively, the queue 241 may reside in a memory (not shown) associated with disk 250. It will be appreciated that embodiments are possible in which queue 241 resides in any of a wide variety of memory locations, or across multiple memory locations, and the invention is not limited to any one location in particular.

Queue 241 generally comprises compressed and/or uncompressed RAM data blocks to be written to disk 250. Such blocks are placed in queue 241 by the compression threads 222, 223, 224 and/or disk writer 225. Queue 241 may in some embodiments also comprise any data to be written to disk 250, including data saved by software that that is outside the scope of the present disclosure. However, for the purposes of this disclosure, we focus on the RAM data blocks A, B, C, and D from guest RAM 212. A given piece of data in the queue 241 can may also be placed in disk 250 internal memory or a disk 250 internal queue. When the disk 250 is done writing the data (such as block A), it notifies the disk writer 225, and the disk writer 225 can retire the data block A from queue 241 since it has now been written.

As illustrated, RAM data blocks may be placed into queue 241 to be written to disk by the memory manager 240. These RAM data blocks may be compressed at any of a wide variety of levels, or may be uncompressed. The differing sizes of the RAM data blocks in queue 241 is intended to suggest different compression levels.

There are a variety of ways to determine how full queue 241 is. In one exemplary approach, when any thread such as 222, 223, 224 and/or the disk writer 225 places data in queue 241, it updates a field indicating queue fullness so that all other threads can determine queue 241 fullness by checking the updated field. Disk writer 225 similarly updates the queue size field when data is removed from the queue 241.

System 200 may further comprise state save software 221. State save software may be included in the host 220, as illustrated, but in other embodiments may run in a hypervisor, guest 212, or other operating environment. State saving software 221 is responsible by saving state of the guest 230 to disk 250.

A state snapshot operation performed by 221 may be initiated in regular time intervals, such as every 5 minutes when the guest 230 is running, or may be initiated by user demand. The snapshot operation is accomplished as described above, namely by launching a plurality of compression threads 222, 223, and 224. Each compression thread 222, 223, 224 takes a RAM data block from guest RAM 212, compresses it at a determined compression level, and places it in queue 241. In the illustrated embodiment, the "disk writer" from FIG. 1 may be embodied as software code that executes as necessary on already-existing threads. The compression threads 222, 223, and 224 are identified as threads in FIG. 2 because in the illustrated embodiment they continue running code for significant chunks of time, so it is appropriate in one embodiment for the compression to occur on dedicated threads. This is not necessarily true of the disk writer 225 as will be appreciated.

State save software 221 may also associate compression threads 222-224 with a priority level. Operating systems such as the MICROSOFT WINDOWS® line of operating systems assign a priority to each thread. A default priority level is assigned unless there is a reason to upgrade or demote a thread. Software 221 can advantageously mark threads 222-224 as low priority because compression is fairly processor intensive and can interfere with other system operations. However, to ensure timely completion of the snapshot, software 221 may increase the thread priority level and/or cause uncompressed RAM data blocks to be placed in queue 241 to avoid waiting an unacceptably long period for compression to finish up on the last few blocks.

Figure 3:
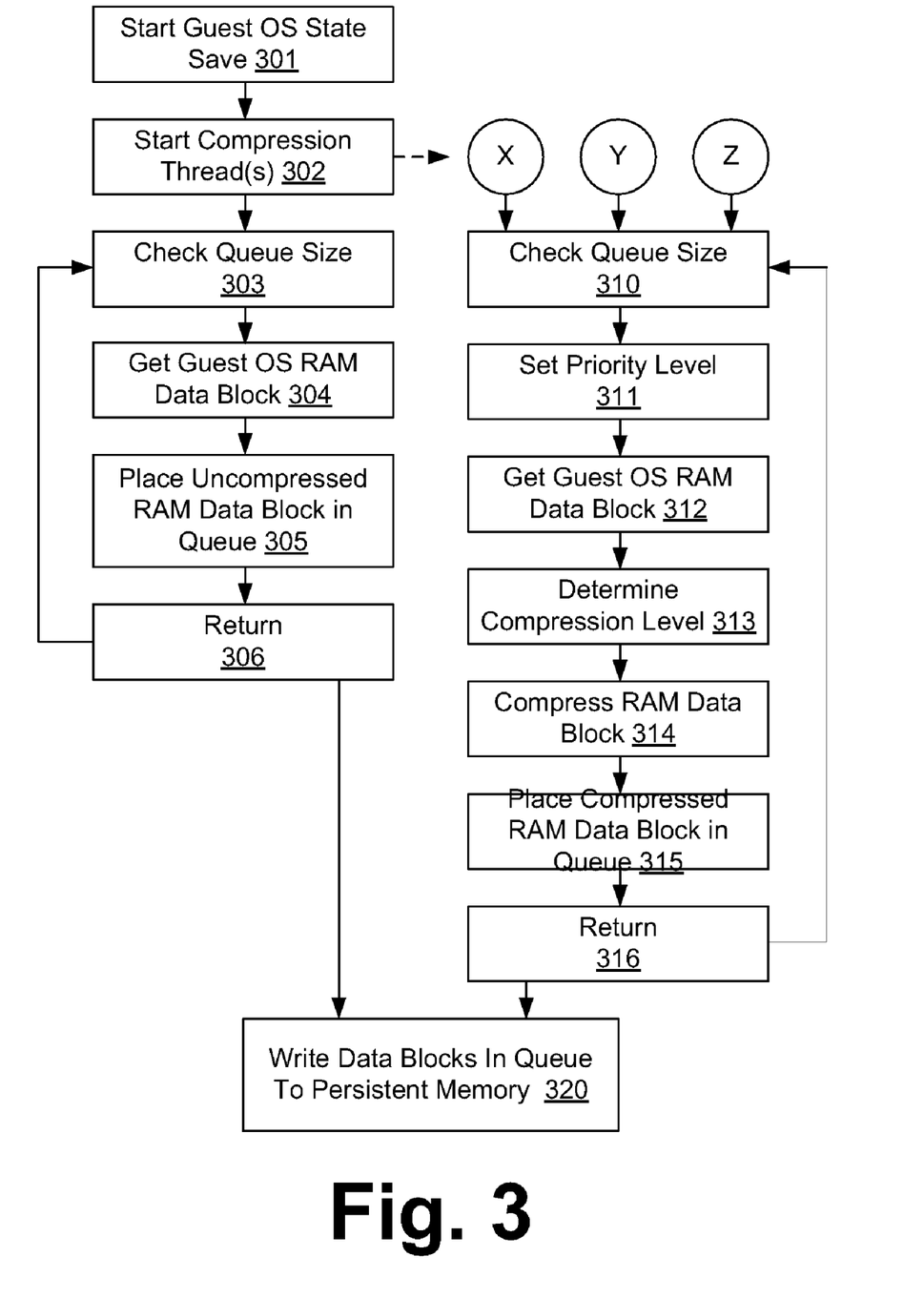
FIG. 3 illustrates steps of an exemplary method as may be carried out by a system such as FIG. 2.

FIG. 3 illustrates steps of an exemplary method as may be carried out by a system such as FIG. 2. First, a state snapshot operation is initiated 301. Next, a plurality of compression threads X, Y, and Z are started 302. Each compression thread can start performing the operations 310-316 illustrated beneath the illustrated threads, while the disk writer continues with operations 303-306 on the left side of the diagram.

Referring first to the operations of the compression threads, each thread may check queue size 310. As described above, queue size may be maintained, for example, in a field that is updated by all threads placing data in the queue. The field may be checked by a compression thread 310.

Each thread may be set to a priority level 311. This operation may in fact not be performed by the thread itself, and may instead be set on the thread's behalf by the state save software, disk writer, or operating system. A same priority level may be assigned to each of the compression threads X, Y, and Z, or the threads may be assigned differing priority levels. Alternatively, in some embodiments, it may be possible for a thread to set its own priority level based on for example conditions relevant to the urgency of the state snapshot, and the likelihood that the snapshot will disrupt other computer system operations.

Each compression thread may get a RAM data block 312. Getting a RAM data block may comprise, for example, getting the RAM addresses for a next data block. A field may be maintained wherein each thread indicates a most recently retrieved block, and each thread may check such field, determine addresses for the next RAM data block, and update the field. In the case of a logical rather than physical RAM, the operation may be somewhat more complicated and may comprise, for example, retrieving all the data in a segment of logical RAM and placing it into a same location in physical hardware such as in RAM 210 from FIG. 2.

Each compression thread may determine a compression level 313. As described above, the determining can be based on a size of the queue. For example, in one embodiment, when the queue is large as measured by the time it will take to write it to disk, the compression level may be set higher. When the queue is small the compression level may be set lower—thereby ensuring the disk is kept busy.

The compression threads may compress 314 the retrieved RAM data block at the determined compression level, and place it in the queue 315. Compression may be accomplished using any of a variety of compression algorithms available in the art. Exemplary compression algorithms include, for example, Adaptive Huffman Coding, Lempel-Ziv-Welch, Exponential-Golomb Coding, Run-Length Encoding, Arithmetic Coding, and so forth as appreciated by those of skill in the art. The invention does not require use of any specific compression algorithm, but may be used in conjunction with these or any other compression algorithm presently available or subsequently developed in the art.

Placing the RAM data block in the queue can comprise placing the compressed data output of the compression algorithm into a portion of a computer system's RAM that is reserved as a disk queue. It may also comprise placing the compressed block in a memory location maintained by a server, disk hardware, or the like that exists exclusively for the purpose of buffering disk-write data. A compression thread may have direct access to such location or may need to pass the compressed block to some intermediary as will be appreciated.

Compression threads may finally return 316 for example to step 310, or may pause until instructed to take up another RAM data block. It should be emphasized that threads may independently perform the operations of 310, 311, and 313, or such steps may be performed on the threads' behalf. The data block placed in the queue is written to disk in step 320.

Referring next to operations on the left side of FIG. 3, these operations may optionally be performed in parallel to the work of the compression threads, or may be done when a previously queued I/O job completes, or at some other juncture as appropriate, such as at regular intervals such as upon the elapse of a predetermined time interval or upon the completion of a compression thread in step 316.

Queue size may be checked 303. If the queue size is above a maximum size limit, the compression threads X, Y, and Z may be paused until the queue shrinks back below such size limit, at which time the compression threads may be restarted. If the compression threads are found to max out the queue regularly, the number of compression threads may be reduced. However, starting a new thread is computationally expensive, so in preferred embodiments the threads X, Y, and Z will continue to exist and loop until the queue is full, at which point they pause, or until the compression is done, at which point they exit.

If the queue size is below a minimum predetermined size, then an uncompressed RAM data block may be retrieved 304 and placed in the queue 305. The operation may then return 306 to check queue size periodically as before. The block is written to disk 320.

The disk writer may also perform additional operations beyond 303-306 such as, for example, determining that the state snapshot operation is near completion, then placing all remaining uncompressed RAM data blocks in the queue and/or increasing the priority level of the compression threads. In another embodiment, the disk writer deletes RAM data blocks from the queue as necessary once written to disk, and so forth.

Exemplary Computing Device

Figure 4:
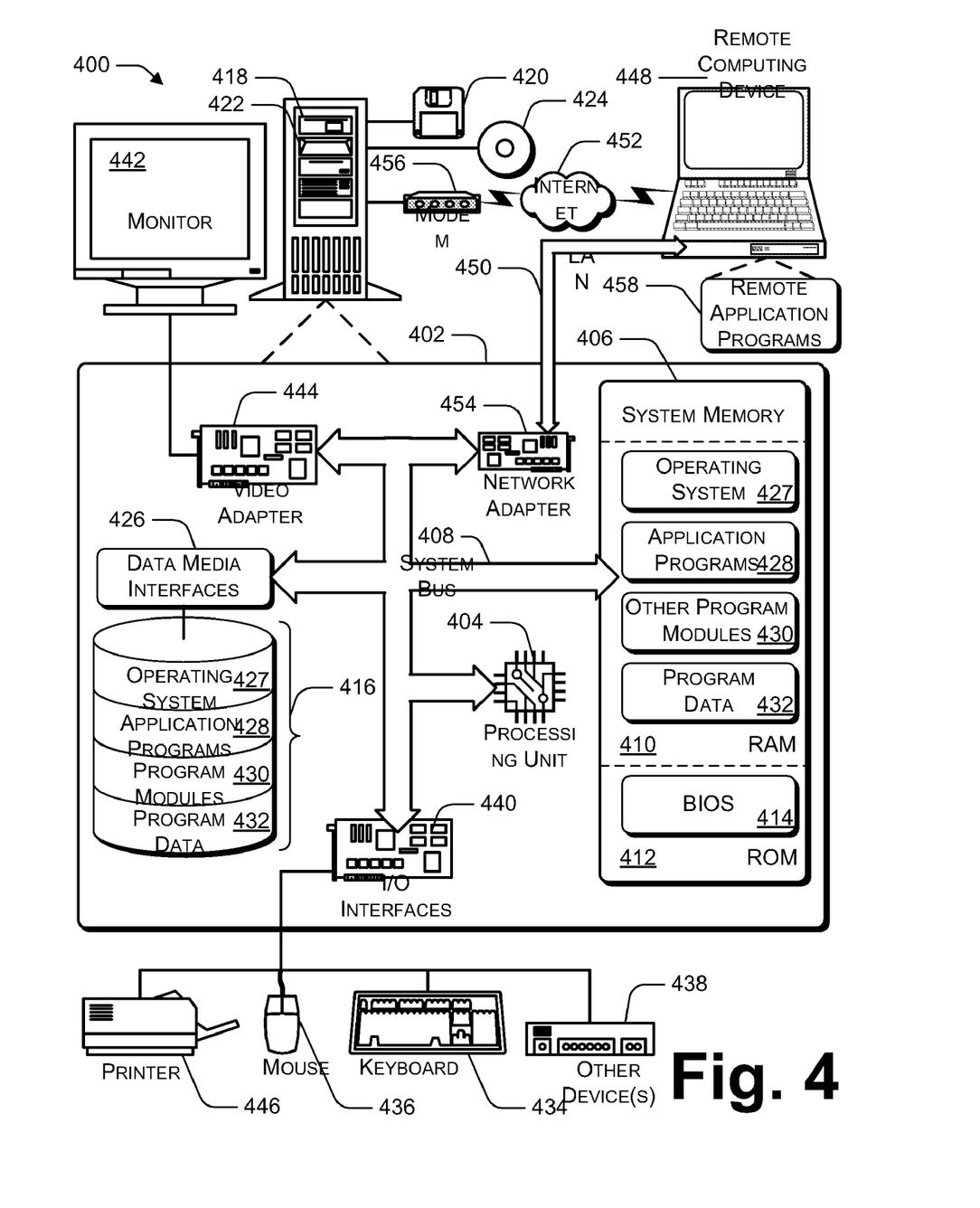
FIG. 4 illustrates aspects of an exemplary computing device as may be configured implement embodiments of the invention.

An exemplary general purpose computer as may be utilized in conjunction with embodiments of the invention is illustrated in FIG. 4. Device electronics 400 are illustrated in FIG. 4, and a schematic blowup 402 is provided to illustrate an exemplary internal architecture of the device. Computing architecture 402 includes one or more processors or processing units 404, a system memory 406, and a bus 408 that couples various system components including the system memory 406 to processors 404.

As referenced above, multiple threads may be executed simultaneously on the multiple logical processors 404 in a multicore or hyperthreading arrangement.

The bus 408 represents one or more of any of several types of bus structures, including a memory bus or memory controller, a peripheral bus, an accelerated graphics port, and a processor or local bus using any of a variety of bus architectures. The system memory 406 includes read only memory (ROM) 412 and random access memory (RAM) 410. A basic input/output system (BIOS) 414, containing the basic routines that help to transfer information between elements within computing device 400, such as during start-up, is stored in ROM 412.

Computing architecture 402 further includes persistent memory such as a hard disk drive 426, and may include a magnetic disk drive 418 for reading from and writing to a removable magnetic disk 420, and an optical disk drive 422 for reading from or writing to a removable optical disk 424 such as a CD ROM or other optical media. The hard disk drive 426, magnetic disk drive 418, and optical disk drive 424 are connected to the bus 408 by appropriate interfaces. The drives and their associated computer-readable media provide nonvolatile storage of computer-readable instructions, data structures, program modules and other data for computing device 400. Although the exemplary environment described herein employs a hard disk, a removable magnetic disk 418 and a removable optical disk 424, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 426, magnetic disk 418, optical disk 424, ROM 412, or RAM 410, including an operating system 427, one or more application programs 428, other program modules 430, and program data 432. A user may enter commands and information into computing device 400 through input devices such as a keyboard 434 and a pointing device 436. An image capture device 446 may also be coupled to the general purpose computer 400 as an input device. Other input devices 438 may include a microphone, joystick, game pad, satellite dish, or the like. These and other input devices are connected to the processing unit 404 through interfaces 440 that are coupled to the bus 408. A monitor 442 or other type of display device is also connected to the bus 408 via an interface 424, such as a video adapter 424.

Generally, the data processors of computing device 400 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory 406.

Computing device 400 may operate in a networked environment using logical connections to one or more remote computers, such as financial institution electronics 448. The financial institution electronics 448 may be one or more server computers, routers, network PCs, and so forth, which typically include many or all of the elements described above relative to computing device 400. The financial institution electronics 448 may run remote application programs 458 which may operate in concert with application programs 428 that execute on the computer 400. For example, a "software component" as described herein may, in one embodiment, execute pursuant to commands from a remote application program 458. The software component may of course also operate in a more autonomous manner, performing certain tasks and then communicated data as necessary back to the remote application programs 458.

When used in a LAN networking environment, a computer 400 is connected to a local network 450 through a network interface or adapter 454. When used in a WAN networking environment, computing device 400 typically includes a modem 456 or other means for establishing communications over the wide area network 452, such as the Internet. The modem 456, which may be internal or external, can be connected to the bus 408 for example via a serial port interface, or by sending a signal to a wireless router which then broadcasts and receives wireless signals to and from a wireless card that is connected to the computer 400.

In a networked environment, program modules depicted relative to the computing device 400, or portions thereof, may be stored in the remote memory storage device. It will be appreciated that the network connections shown are exemplary and other means of establishing a communications link between the computers may be used.

The invention claimed is:

1. A computer system comprising:
   a processor;
   a Random Access Memory (RAM);
   a persistent memory;
   a queue of data to be written in said persistent memory;
   host operating system software executable by said processor and having access to at least a first portion of said RAM;
   guest operating system software having access to a second portion of said RAM; and
   state saving software for saving said second portion of said RAM in said persistent memory, said state saving software configured to start a plurality of compression threads, each thread determining a compression level of a plurality of compression levels for a RAM data block based on a size of said queue, wherein each of the compression levels correspond to a size range of the queue and the compression level for each compression thread is adjusted to one of two adjacent compression levels, compressing said RAM data block at said compression level, and placing said RAM data block in said queue.

2. The computer system of claim 1, wherein said state saving software is included in said host operating system software.

3. The computer system of claim 1, further comprising a hypervisor and wherein said state saving software is included in said hypervisor.

4. The computer system of claim 1, wherein said state saving software associates said compression threads with a low thread priority level.

5. The computer system of claim 4, wherein said state saving software increases said thread priority level to complete said saving said second portion of said RAM in said persistent memory.

6. The computer system of claim 1, wherein said state saving software is also configured to place one or more uncompressed RAM data blocks in said queue when said queue is below a predetermined size.

7. The computer system of claim 1, wherein upon a determination that the queue size is below a threshold size such that remaining RAM data blocks of said second portion of said RAM may be placed in the queue uncompressed, said state saving software is also configured to place one or more uncompressed RAM data blocks in said queue to complete said saving said second portion of said RAM in said persistent memory.

8. The computer system of claim 1, wherein a high compression level is determined for a RAM data block when said queue is large, and wherein a low compression level is determined for a RAM data block when said queue is small.

9. The computer system of claim 1, wherein said determining a compression level for a RAM data block is further based on an amount of time required to compress a RAM data block at the compression level.

10. A method for saving a state of a guest operating system to a persistent memory, comprising:
   starting a plurality of compression threads;
   determining, by a compression thread, a compression level of a plurality of compression levels, wherein said determining is based on a size of a queue comprising data to be written in said persistent memory and wherein each of the compression levels correspond to a size range of the queue and the compression level for each compression thread is adjusted to one of two adjacent compression levels;

compressing, by said compression thread, a guest operating system Random Access Memory (RAM) data block at said compression level;

placing said RAM data block in said queue; and storing said RAM data block in said persistent memory and removing said RAM data block from said queue.

11. The method of claim 10, further comprising setting a low thread priority level for said compression thread.

12. The method of claim 10, further comprising setting a high thread priority level for said compression thread to complete said saving a state of a guest operating system to a persistent memory.

13. The method of claim 10, further comprising placing one or more uncompressed RAM data blocks in said queue when said queue is below a predetermined size.

14. The method of claim 10, further comprising determining that the queue size is below a threshold size such that remaining RAM data blocks of a portion of said RAM may be placed in the queue uncompressed and placing one or more uncompressed RAM data blocks in said queue to complete said saving a state of a guest operating system to a persistent memory.

15. The method of claim 10, wherein a high compression level is determined for said RAM data block when said queue is large, and wherein a low compression level is determined for said RAM data block when said queue is small.

16. The method of claim 10, wherein said determining, by a compression thread, a compression level, is further based on an amount of time required to compress a RAM data block at the compression level.

17. The method of claim 10, further comprising repeating, by each of said plurality of compression threads, said determining, compressing, and placing until an entire portion of a RAM associated with said guest operating system is saved to said persistent memory.

18. A computer readable storage medium having recorded instructions thereon that when processed by a processor save a state of a guest operating system to a persistent memory, said instructions comprising:

instructions for starting a plurality of compression threads;

instructions for determining, by a compression thread, a compression level of a plurality of compression levels, wherein said determining is based on a size of a queue comprising data to be written in said persistent memory and wherein each of the compression levels correspond to a size range of the queue and the compression level for each compression thread is adjusted to one of two adjacent compression levels;

instructions for compressing, by said compression thread, a guest operating system Random Access Memory (RAM) data block at said compression level; and instructions for placing said RAM data block in said queue, thereby causing said RAM data block to be written to said persistent memory.

19. The computer readable storage medium of claim 18, further comprising instructions for adjusting a thread priority level of said compression thread.

20. The computer readable storage medium of claim 18, further comprising instructions for placing one or more uncompressed RAM data blocks in said queue when said queue is below a predetermined size.

* * * * *